US012659581B1

(12) United States Patent (10) Patent No.: US 12,659,581 B1
Kong (45) Date of Patent: Jun. 16, 2026

(54) NAVIGATION DEVICE AND FRAME RATE CONTROL METHOD THEREOF

(71) Applicant: PIXART IMAGING INC., Hsin-Chu County (TW)

(72) Inventor: Shang Chan Kong, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 53 days.

(21) Appl. No.: 18/977,946

(22) Filed: Dec. 12, 2024

(51) Int. Cl.
| | |
|---|---|
| *H04N 23/667* | (2023.01) |
| *G06F 3/0354* | (2013.01) |
| *G06T 7/80* | (2017.01) |
| *H04N 23/60* | (2023.01) |
| *H04N 23/68* | (2023.01) |

(52) U.S. Cl.
CPC ....... *H04N 23/667* (2023.01); *G06F 3/03543* (2013.01); *G06T 7/80* (2017.01); *H04N 23/60* (2023.01); *H04N 23/6811* (2023.01)

(58) Field of Classification Search
None
See application file for complete search history.

(56) References Cited

U.S. PATENT DOCUMENTS

| | | | | |
|---|---|---|---|---|
| 2004/0130532 A1* | 7/2004 | Gordon | | G06F 3/03547 |
| | | | | 345/166 |
| 2014/0306892 A1* | 10/2014 | Lin | | G09G 5/22 |
| | | | | 345/159 |
| 2015/0301630 A1* | 10/2015 | Lee | | G06F 3/0383 |
| | | | | 345/163 |
| 2016/0054816 A1* | 2/2016 | Lee | | G01B 11/14 |
| | | | | 345/166 |
| 2018/0364818 A1* | 12/2018 | Tan | | G06F 3/0383 |
| 2024/0098347 A1* | 3/2024 | Jang | | H04N 5/783 |

* cited by examiner

*Primary Examiner* — Paul M Berardesca
(74) *Attorney, Agent, or Firm* — HAUPTMAN HAM, LLP

(57) ABSTRACT

There is provided a navigation device including an image sensor and a processor. The image sensor is arranged to capture image frames at one of multiple predetermined frame rates. The processor fine-tunes an upshift threshold and a downshift threshold upon noticing a frame rate oscillation may occur due to an upshift speed, which corresponds to the upshift threshold at a current frame rate, being lower than a downshift speed, which corresponds to the downshift threshold at a frame rate one step higher than the current frame rate, or switches a current frame rate based on multiple shifting thresholds.

20 Claims, 2 Drawing Sheets

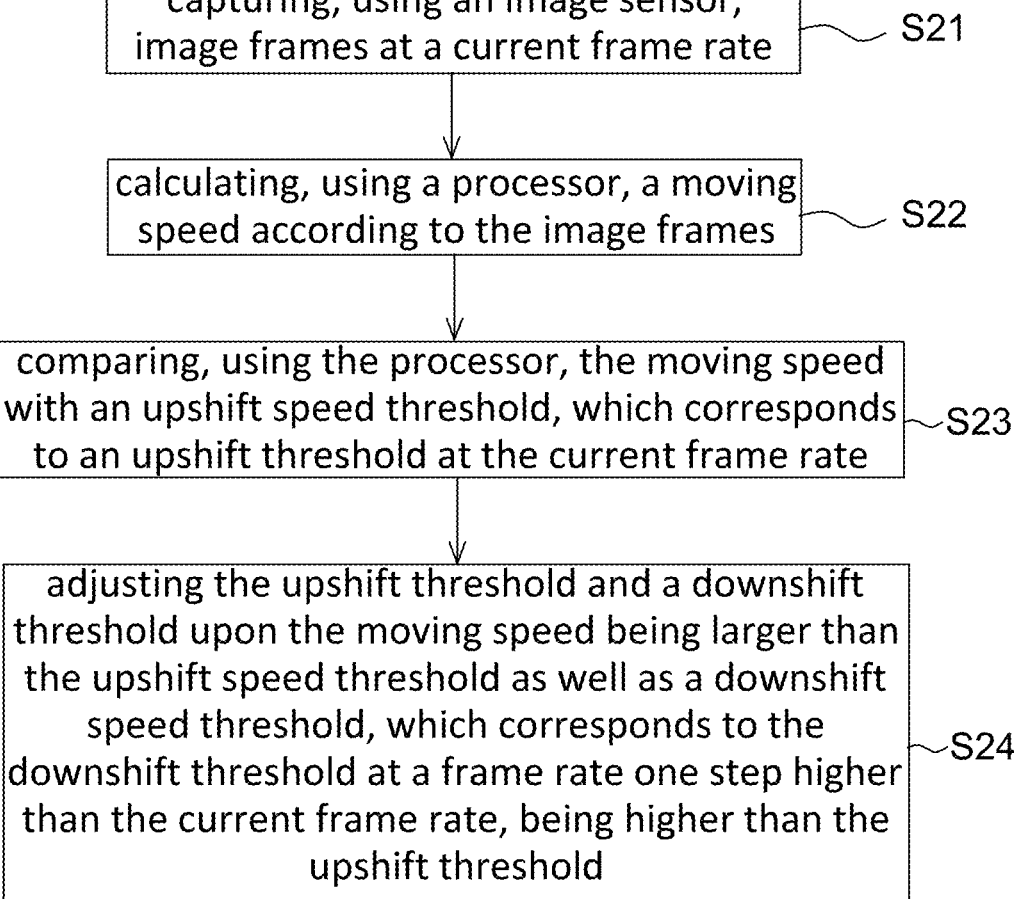

capturing, using an image sensor, image frames at a current frame rate ~S21 calculating, using a processor, a moving speed according to the image frames ~S22 comparing, using the processor, the moving speed with an upshift speed threshold, which corresponds to an upshift threshold at the current frame rate ~S23 adjusting the upshift threshold and a downshift threshold upon the moving speed being larger than the upshift speed threshold as well as a downshift speed threshold, which corresponds to the downshift threshold at a frame rate one step higher than the current frame rate, being higher than the upshift threshold ~S24

FIG. 2

NAVIGATION DEVICE AND FRAME RATE CONTROL METHOD THEREOF

FIELD OF THE DISCLOSURE

This disclosure generally relates to a navigation device and, more particularly, to the frame rate control of a navigation device that adaptively adjusts shifting thresholds or arranges multiple upshift and downshift thresholds so as to reduce overall power consumption and maintain frame rate stability of a sensor of the navigation device.

BACKGROUND OF THE DISCLOSURE

A sensor of navigation devices is generally arranged with multiple steps of operable frame rates to be selected corresponding to a moving speed of the navigation devices. When the navigation devices are moved at a high speed, a high frame rate among the multiple frame rates is used to capture image frames, and a low frame rate among the multiple frame rates is used to capture image frames when the navigation devices are moved at a low speed.

Conventionally, the navigation devices are arranged with a fixed upshift threshold and a fixed downshift threshold for switching a current frame rate between the multiple frame rates. Generally, the fixed downshift threshold is set lower than the fixed upshift threshold so as to avoid the oscillation between two frame rates.

Because the movement of a navigation device is calculated as a speed value, e.g., inch per second (ips). The fixed upshift threshold and the fixed downshift threshold are respectively changed to multiple upshift speed thresholds and multiple downshift speed thresholds (e.g., indicated by ips) corresponding to different frame rates for being compared with a currently calculated moving speed. Corresponding to the operable frame rates, a downshift speed threshold for a current step of frame rate may be lower than an upshift speed threshold for a previous step of frame rate that causes the frame rate oscillation to occur, especially for a high frame rate condition.

Due to gaming mice becoming more and more popular in present days and the gaming mice generally requiring high frame rate capability, it is necessary to solve the frame rate oscillation problem mentioned above.

SUMMARY

Accordingly, the present disclosure provides a navigation device and a frame rate control method thereof that adaptively fine tune at least one of an upshift threshold and a downshift threshold according to a current moving speed calculated by a processor.

The present disclosure further provides a navigation device and a frame rate control method thereof that records multiple sets of upshift thresholds and downshift thresholds to make sure a downshift speed corresponding to a current frame rate is always lower than an upshift speed corresponding to a previous frame rate to solve the oscillation issue between two frame rates and lower the total power consumption.

The present disclosure provides a navigation device including an image sensor, a memory and a processor. The image sensor is configured to capture image frames at one of multiple predetermined frame rates. The memory is recorded with an upshift threshold and a downshift threshold. The processor is configured to calculate a moving speed according to the image frames captured by the image sensor at a current frame rate, compare the moving speed with an upshift speed, which corresponds to the upshift threshold at the current frame rate, and adjust at least one of the upshift threshold and the downshift threshold upon the moving speed being larger than the upshift speed, and a downshift speed, which corresponds to the downshift threshold at a frame rate one step higher than the current frame rate, being higher than the upshift threshold.

The present disclosure further provides a navigation device including an image sensor, a memory and a processor. The image sensor is configured to capture image frames at one of multiple predetermined frame rates. The memory is recorded with a first upshift threshold, a second upshift threshold lower than the first upshift threshold, a first downshift threshold lower than the first upshift threshold, and a second downshift threshold lower than the first downshift threshold as well as the second upshift threshold. The processor is configured to calculate a moving speed according to the image frames captured by the image sensor at a current frame rate, switch the current frame rate to a frame rate one step higher than the current frame rate upon the moving speed becoming higher than a first upshift speed, which corresponds to the first upshift threshold, or higher than a second upshift speed, which corresponds to the second upshift threshold, and switch the current frame rate to a frame rate one step lower than the current frame rate upon the moving speed becoming lower than a first downshift speed, which corresponds to the first downshift threshold, or lower than a second downshift speed, which corresponds to the second downshift threshold.

The present disclosure further provides a frame rate control method of a navigation device. The navigation device includes an image sensor, a memory recorded with an upshift threshold and a downshift threshold, and a processor. The frame rate control method includes the steps of: capturing, using the image sensor, image frames at a current frame rate, calculating, using the processor, a moving speed according to the image frames; comparing, using the processor, the moving speed with an upshift speed, which corresponds to the upshift threshold at the current frame rate; and adjusting the upshift threshold and the downshift threshold upon the moving speed being larger than the upshift speed as well as a downshift speed, which corresponds to the downshift threshold at a frame rate one step higher than the current frame rate, being higher than the upshift threshold.

The present disclosure further provides a navigation device including an image sensor. The image sensor is configured to capture image frames at one of multiple predetermined frame rates, wherein each of the predetermined frame rates corresponds to an upshift speed and a downshift speed. The downshift speed corresponding to each predetermined frame rate is lower than the upshift speed corresponding to one predetermined frame one step slower than the each predetermined frame rate.

BRIEF DESCRIPTION OF DRAWINGS

Other objects, advantages, and novel features of the present disclosure will become more apparent from the following detailed description when taken in conjunction with the accompanying drawings.

FIG. 2 is a flow chart of a frame rate control method of a navigation device according to one embodiment of the present disclosure.

DETAILED DESCRIPTION OF THE DISCLOSURE

Figure 1:
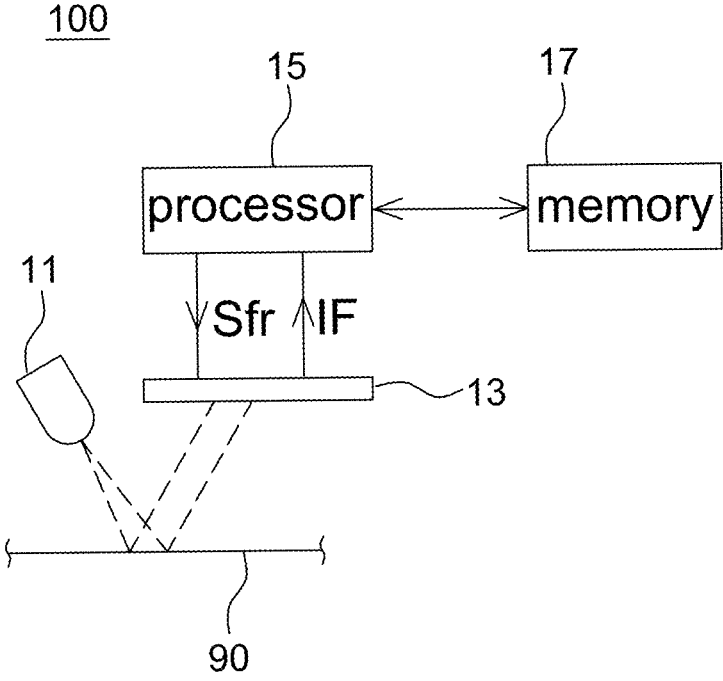
FIG. 1 is a schematic diagram of a navigation device according to one embodiment of the present disclosure.

It should be noted that, wherever possible, the same reference numbers will be used throughout the drawings to refer to the same or like parts.

One objective of the present disclosure is to provide a navigation device and a frame rate control method thereof that adaptively adjust shifting thresholds or previously arrange multiple sets of shifting thresholds to avoid the frame rate oscillation generally occurred at high frame rate operation.

Please refer to FIG. 1, it is a schematic diagram of a navigation device 100 according to one embodiment of the present disclosure. The navigation device 100 is an optical mouse device suitable to be operated at a high moving speed, such as a gaming mouse, but not limited thereto.

The navigation device 100 includes a light source 11, an image sensor 13, a processor 15 and a memory 17. Although FIG. 1 shows that the memory 17 is outside of the processor 15, it is only intended to illustrate but not to limit the present disclosure. In another aspect, the memory 17 is embedded inside the processor 15.

The light source 11 is a coherent light source, a partially coherent light source or a non-coherent light source, such as a light emitting diode or a laser diode. The light source 11 emits light of a recognizable spectrum to illuminate a work surface 90 such as a table surface, a paper surface, a mouse pad surface or the like without particular limitations.

The image sensor 15 is a complementary metal oxide semiconductor (CMOS) image sensor, a charge coupled device (CCD) image sensor or a single photon avalanche diode (SPAD) image sensor without particular limitations. The image sensor 15 is used to capture image frames at one of multiple predetermined frame rates (e.g., 1033 to 17557 frames per second as shown in Table I below) by receiving reflected light from the work surface 90. In one aspect, a higher step (e.g., having steps 1 to 17 shown in Table I) of frame rate has a lower frame rate.

The processor 15 is an application specific integrated circuit (ASIC), a micro controller unit (MCU), a field programmable gate array (FPGA), a digital signal processor (DSP) or the like. The processor 15 implements its functions, including calculating a moving speed, calculating shifting speeds, comparing the moving speed with the shifting speeds and adjusting shifting thresholds as mentioned below, using the hardware, software and/or firmware embedded therein or in a chip having the processor 15.

The memory 17 is a volatile memory and/or a non-volatile memory which is accessed by the processor 15 in operation. The memory 17 previously records at least one upshift threshold, e.g., 7 shown in Table I, and at least one downshift threshold, e.g., 5 shown in Table I. In the present disclosure, a unit of the upshift threshold and the downshift threshold is a number of pixels of the image sensor 13. That is, the image sensor 13 includes a plurality of pixels arranged in a matrix to form a pixel array.

TABLE I

| Step | Frame Rate | Upshift Speed (ips) @ 45 deg | Upshift Threshold | Downshift Speed (ips) @ 45 deg | Downshift Threshold |
|---|---|---|---|---|---|
| 1 | 17557 | 205.28 | 7 | 146.63 | 5 |
| 2 | 8779 | 102.64 | | 73.31 | |
| 3 | 5852 | 68.43 | | 48.88 | |
| 4 | 4389 | 51.32 | | 36.66 | |
| 5 | 3511 | 41.06 | | 29.33 | |
| 6 | 2926 | 34.21 | | 24.44 | |
| 7 | 2508 | 29.33 | | 20.95 | |
| 8 | 2195 | 25.66 | | 18.33 | |
| 9 | 1951 | 22.81 | | 16.29 | |
| 10 | 1756 | 20.53 | | 14.66 | |
| 11 | 1596 | 18.66 | | 13.33 | |
| 12 | 1463 | 17.11 | | 12.22 | |
| 13 | 1351 | 15.79 | | 11.28 | |
| 14 | 1254 | 14.66 | | 10.47 | |
| 15 | 1170 | 13.69 | | 9.78 | |
| 16 | 1097 | 12.83 | | 9.16 | |
| 17 | 1033 | 12.08 | | 8.63 | |

The processor 15 further calculates upshift speeds based on the upshift threshold and the multiple predetermined frame rates, and calculates downshift speeds based on the downshift threshold and the multiple predetermined frame rates. For example, if it is assumed that a pixel size of the image sensor 13 is 30 μm, an upshift speed corresponding to the frame rate 17557 is equal to 5.2141 m/s calculated according to an equation $(7 \times 30 \ \mu m)/(1/17557 \ fps) \times 1.4142$, wherein the 1.4142 is a diagonal ratio at 45 degrees in a two-dimensional space on the work surface 90. Dividing 5.2141 m/s by 25400 μm, it is able to obtain a corresponding upshift speed=205.28 ips as shown in Table I. Other upshift speeds and downshift speeds may be obtained using similar calculations and thus details thereof are not repeated herein. In the present disclosure, a unit of the upshift speeds and the downshift speeds is an inch per second (ips), but not limited to.

Referring to Table I again, when the image sensor 13 captures image frames at the 11th step of frame rate=1596 frames per second, the processor 15 then calculates a current moving speed of the navigation device 100 using the image frames (e.g., shown as IF in FIG. 1) received from the image sensor 13, e.g., using the image correlation, but not limited to. The processor 15 may use other known methods in the art to calculate the moving speed of the navigation device 100 without being limited to using the image correlation. When the current moving speed is larger than 18.66 ips, the processor 15 then sends a control signal (e.g., shown as Sfr in FIG. 1) to the image sensor 13 to switch the current frame rate to a frame rate one step higher than the current frame rate, e.g., to the 12th step.

Then, when the image sensor 13 captures image frames at the 12th step of frame rate=1756 frames per second, the processor 15 calculates another current moving speed of the navigation device 100 using the image frames (e.g., shown as IF in FIG. 1) received from the image sensor 13. When said another current moving speed is lower than 14.66 ips, the processor 15 then sends a control signal (e.g., shown as Sfr in FIG. 1) to the image sensor 13 to switch the current frame rate to a frame rate one step lower than the current frame rate, e.g., to the 11th step. At these frame rates, no frame rate oscillation occurs.

However, when the image sensor 13 captures image frames at the 2nd step of frame rate=8779 frames per second, the frame rate oscillation may occur since a downshift speed=146.63 ips at the 1st step of frame rate is higher than an upshift speed=102.64 ips at the 2nd step frame rate.

Similarly, when the image sensor 13 captures image frames at the 3rd step of frame rate, the processor 15 calculates a moving speed according to the image frames captured by the image sensor 13 at a current frame rate, i.e. 5852 frames per second. The processor 15 notices that a downshift speed=73.31 ips, which corresponds to the down-shift threshold at a frame rate (i.e. 2nd step) one step higher than the current frame rate, is higher than an upshift speed=68.43 ips, which corresponds to the upshift threshold at the current frame rate (i.e. 3rd step). The frame rate oscillation occurs when the moving speed is between 68.43 ips and 73.31 ips.

TABLE II

| Step | Frame Rate | Upshift Speed (ips) @ 45 deg | Upshift Threshold | Downshift Speed (ips) @ 45 deg | Downshift Threshold |
|---|---|---|---|---|---|
| 1 | 17557 | 205.28 | 7 | 146.63 | 5 |
| 2 | 8779 | 102.64 | 7 | 65.98 | 4.5 |
| 3 | 5852 | 73.31 | 7.5 | 48.88 | 5 |
| 4 | 4389 | 51.32 | 7 | 36.66 | 5 |
| 5 | 3511 | 41.06 | 7 | 29.33 | 5 |
| 6 | 2926 | 34.21 | 7 | 24.44 | 5 |

To solve this frame rate oscillation problem, the present disclosure provides a frame rate control of the navigation device 100 as shown in Table II. In one aspect, the processor 15 compares the moving speed calculated at a current frame rate with the upshift speed (i.e. 68.43 ips at the 3rd step of frame rate as shown in Table I), and adjusts at least one of the upshift threshold and the downshift threshold when the moving speed is larger than the upshift speed, i.e. a condition for upshifting frame rate.

In one aspect, the processor 15 increases the upshift threshold corresponding to the 3rd step of frame rate (i.e. current frame rate) and decreases the downshift threshold corresponding to the 2nd step of frame rate (i.e. one step higher frame rate) as shown in Table II. In one aspect, the increment and the decrement of the thresholds are set as a half of a difference between the upshift threshold and the downshift threshold, e.g., 0.5 as shown in Table II. However, the increment and the decrement of the thresholds are not limited to 0.5 but may be other values as long as a downshift speed (e.g., 65.98 ips at the 2nd step of frame rate shown in Table II) corresponding to the decreased downshift threshold (e.g., 4.5 shown in Table II) is lower than an upshift speed (e.g., 73.31 ips at the 3rd step of frame rate shown in Table II) corresponding to the increased upshift threshold (e.g., 7.5 shown in Table II). However, it is not necessary to adjust both the upshift threshold and the downshift threshold at the same time.

In another aspect, the processor 15 increases the upshift threshold but maintains (not changing) the downshift thresh-old as long as the downshift speed corresponding to the maintained downshift threshold (e.g., the downshift thresh-old at the 2nd step of frame rate still 5 as shown in Table I) is still lower than an upshift speed corresponding to the increased upshift threshold (e.g., increasing more than 7.5).

In a further aspect, the processor 15 maintains (not changing) the upshift threshold but decreases the downshift threshold as long as a downshift speed (e.g., 65.98 ips at the 2nd step of frame rate shown in Table II) corresponding to the decreased downshift threshold (e.g., 4.5 shown in Table II) becomes to be lower than the upshift speed (e.g., 68.43 ips at the 3rd step of frame rate shown in Table I) corre-sponding to the maintained upshift threshold (e.g., 7 shown in Table I).

After tuning one of the upshift threshold and the down-shift threshold, the processor 15 switches the current frame rate (e.g., the 3rd step) to a frame rate one step higher than the current frame rate (e.g., to the 2nd step) when the moving speed (calculated using image frames captured at the 3rd step) is higher than the adjusted upshift speed (e.g., 73.31 ips at the 3rd step of frame rate as shown in Table II) when the upshift threshold is adjusted (e.g., from 7 to 7.5).

On the other hand, when the upshift threshold is not adjusted, the processor 15 switches the current frame rate (e.g., the 3rd step) to a frame rate one step higher than the current frame rate (e.g., to the 2nd step) when the moving speed (calculated using image frames captured at the 3rd step) is higher than the upshift speed (e.g., 68.43 ips at the 3rd step of frame rate as shown in Table I).

In another embodiment, the frame rate control of the navigation device 100 is shown in Table III. In the aspect of Table III, the memory 17 is recorded with a first upshift threshold (e.g., shown as THup1=15), a second upshift threshold (e.g., shown as THup2=7) lower than the first upshift threshold THup1, a first downshift threshold (e.g., shown as THdn1=13) lower than the first upshift threshold THup1, and a second downshift threshold (e.g., shown as THdn2=5) lower than the first downshift threshold THup1 as well as the second upshift threshold THup2.

Similarly, a unit of the first upshift threshold THup1, the second upshift threshold THup2, the first downshift thresh-old THdn1 and the second downshift threshold THdn2 is a number of pixels of the image sensor 13.

TABLE III

| Step | Frame Rate | Upshift Speed (ips) @ 45 deg | Upshift Threshold | Downshift Speed (ips) @ 45 deg | Downshift Threshold |
|---|---|---|---|---|---|
| 1 | 17557 | 439.89 | THup1 = 15 | 190.62 | THdn1 = 13 |
| 2 | 8779 | 219.94 | | 73.31 | THdn2 = 5 |
| 3 | 5852 | 146.64 | | 48.88 | |
| 4 | 4389 | 51.32 | THup2 = 7 | 36.66 | |
| 5 | 3511 | 41.06 | | 29.33 | |
| 6 | 2926 | 34.21 | | 24.44 | |
| 7 | 2508 | 29.33 | | 20.95 | |
| 8 | 2195 | 25.66 | | 18.33 | |
| 9 | 1951 | 22.81 | | 16.29 | |
| 10 | 1756 | 20.53 | | 14.66 | |
| 11 | 1596 | 18.66 | | 13.33 | |
| 12 | 1463 | 17.11 | | 12.22 | |
| 13 | 1351 | 15.79 | | 11.28 | |
| 14 | 1254 | 14.66 | | 10.47 | |
| 15 | 1170 | 13.69 | | 9.78 | |
| 16 | 1097 | 12.83 | | 9.16 | |
| 17 | 1033 | 12.08 | | 8.63 | |

As mentioned above, the processor 15 calculates first upshift speeds based on the first upshift threshold THup1 and corresponding frame rates, e.g., upshift speeds corre-sponding to the 1st to 3rd step of frame rate shown in Table III; calculates second upshift speeds based on the second upshift threshold THup2 and corresponding frame rates, e.g., upshift speeds corresponding to the 4th to 17th step of frame rate shown in Table III; calculates first downshift speeds based on the first downshift threshold THdn1 and corresponding frame rates, e.g., downshift speeds corre-sponding to the 1st step of frame rate shown in Table III; and calculates second downshift speeds based on the downshift upshift threshold THdn2 and corresponding frame rates, e.g., downshift speeds corresponding to the 2nd to 17th step of frame rate shown in Table III. Similarly, a unit of the first upshift speed, the second upshift speed, the first downshift speed and the second downshift speed is an inch per second (ips), but not limited to.

As mentioned above, the frame rate oscillation generally occurs at high frame rate operation, and thus frame rates among the multiple predetermined frame rates corresponding to the first upshift threshold THup1 and the first downshift threshold THdn1 are preferably higher than 5000 frames per second, i.e. 5000 frames per second being considered the high speed operation herein.

As shown in Table III, the first upshift threshold THup1 and the first downshift threshold THdn1 are arranged corresponding to the highest frame rate among the multiple predetermined frame rates.

It should be mentioned that a number of the first upshift threshold THup1 is not limited to 3, and a number of the first downshift threshold THdn1 is not limited to 1. The first upshift threshold(s) THup1 and the first downshift threshold(s) THdn1 are arranged in the way that the first downshift speed at a current step of frame rate (e.g., the 1st step) is lower than the first upshift speed at a step of frame rate previous to the current step of frame rate (e.g., the 2nd step). It is seen from Table III that each of the downshift speeds are lower than a previous upshift speed such that no oscillation occurs.

In the aspect of Table III, the processor 15 calculates a moving speed according to the image frames captured by the image sensor 13 at a current frame rate. The processor 15 switches the current frame rate to a frame rate one step higher than the current frame rate when the moving speed becomes higher than a first upshift speed, which corresponds to a first upshift threshold THup1, or higher than a second upshift speed, which corresponds to a second upshift threshold THup. The processor 15 switches the current frame rate to a frame rate one step lower than the current frame rate when the moving speed becomes lower than a first downshift speed, which corresponds to a first downshift threshold THdn1, or lower than a second downshift speed, which corresponds to a second downshift threshold THdn2.

In a further aspect, the memory 17 is recorded with multiple upshift thresholds and multiple downshift thresholds, e.g., four sets of upshift thresholds and downshift thresholds being shown in Table IV, but the present disclosure is not limited thereto.

TABLE IV

| Step | Frame Rate | Upshift Speed (ips) @ 45 deg | Upshift Threshold | Downshift Speed (ips) @ 45 deg | Downshift Threshold |
|---|---|---|---|---|---|
| 1 | 17557 | 439.89 | THup1 = 15 | 190.62 | THdn1 = 13 |
| 2 | 8779 | 219.94 | | 131.97 | THdn3 = 9 |
| 3 | 5852 | 136.85 | THup3 = 14 | 87.98 | |
| 4 | 4389 | 102.64 | | 51.32 | THdn4 = 7 |
| 5 | 3511 | 58.65 | THup4 = 10 | 41.06 | |
| 6 | 2926 | 48.88 | | 34.21 | |
| 7 | 2508 | 41.89 | | 29.33 | |
| 8 | 2195 | 36.66 | | 18.33 | THdn2 = 5 |
| 9 | 1951 | 22.81 | THup2 = 7 | 16.29 | |
| 10 | 1756 | 20.53 | | 14.66 | |
| 11 | 1596 | 18.66 | | 13.33 | |
| 12 | 1463 | 17.11 | | 12.22 | |
| 13 | 1351 | 15.79 | | 11.28 | |
| 14 | 1254 | 14.66 | | 10.47 | |

8

TABLE IV-continued

| Step | Frame Rate | Upshift Speed (ips) @ 45 deg | Upshift Threshold | Downshift Speed (ips) @ 45 deg | Downshift Threshold |
|---|---|---|---|---|---|
| 15 | 1170 | 13.69 | | 9.78 | |
| 16 | 1097 | 12.83 | | 9.16 | |
| 17 | 1033 | 12.08 | | 8.63 | |

Compared to the aspect shown in Table III, the memory 17 is further recorded with a third upshift threshold (e.g., shown as THup3=14 as shown in Table IV) between the first upshift threshold THup1 and the second upshift threshold THup2, and a third downshift threshold (e.g., shown as THdn3=9 as shown in Table IV) between the first downshift threshold THdn1 and the second downshift threshold THdn2.

In a further aspect, the memory 17 is further recorded with a fourth upshift threshold (e.g., shown as THup4=10 as shown in Table IV) between the third upshift threshold THup3 and the second upshift threshold THup2, and a fourth downshift threshold (e.g., shown as THdn4=7 as shown in Table IV) between the third downshift threshold THdn3 and the second downshift threshold THdn2.

Similarly, the processor 15 compares a current moving speed with upshift speeds (corresponding to upshift thresholds THup1 to THup4) and downshift speeds (corresponding to downshift thresholds THdn1 to THdn4) to switch a current frame rate among the multiple predetermined frame rates.

Please refer to FIG. 2, it is a flow chart of a frame rate control method of a navigation device according to one embodiment of the present disclosure. The frame rate control method is adaptable to the navigation device 100 shown in FIG. 1 and includes the steps of: capturing, using the image sensor 13, image frames at a current frame rate (Step S21); calculating, using the processor 15, a moving speed according to the image frames (Step S22); comparing, using the processor 15, the moving speed with an upshift speed, which corresponds to an upshift threshold at the current frame rate (Step S23); and adjusting the upshift threshold and an downshift threshold upon the moving speed being larger than the upshift speed as well as a downshift speed, which corresponds to the downshift threshold at a frame rate one step higher than the current frame rate, being higher than the upshift threshold (Step S24).

Step S21-S22: Details of capturing image frames by the image sensor 13 and calculating a moving speed by the processor 15 have been illustrated above, and thus details thereof are not repeated herein.

Step S23-S24: For example in the aspect of Table II, the processor 15 increases the upshift threshold (e.g., from 7 to 7.5, but not limited to) and decreases the downshift threshold (e.g., from 5 to 4.5, but not limited to) when the moving speed exceeds the upshift threshold to cause the downshift speed corresponding to the decreased downshift threshold (e.g., 4.5) to be lower than the upshift speed corresponding to the increased upshift threshold (e.g., 7.5). It is seen from Table I that a downshift speed (e.g., 73.31 ips) at the 2nd step of frame rate is higher than an upshift speed (e.g., 68.43 ips) at the 3rd step of frame rate, and seen from Table II that a downshift speed (e.g., 65.98 ips) at the 2nd step of frame rate becomes to be lower than an upshift speed (e.g., 73.31 ips) at the 3rd step of frame rate after the shifting thresholds are adjusted.

For example in the aspect of Table III, the processor 15 increases both the upshift threshold (e.g., from 7 to 15, but not limited to) and the downshift threshold (e.g., from 5 to 13, but not limited to) corresponding to the highest operable frame rates of the image sensor 13 when the moving speed exceeds the upshift threshold to cause the downshift speed corresponding to the increased downshift threshold (e.g., 13) to be lower than the upshift speed corresponding to the increased upshift threshold (e.g., 15) at a previous frame rate. It is seen from Table III that a downshift speed (e.g., 190.62 ips) at the 1st step of frame rate becomes to be lower than an upshift speed (e.g., 219.94 ips) at the 2nd step of frame rate.

As mentioned above, it is possible to previously arrange multiple upshift thresholds and multiple downshift thresholds in the memory 17 as shown in Table IV.

In this way, besides the frame rate oscillation issue is solved, the total power consumption is also reduced since it is more difficult for the image sensor 13 to switch to a higher step of frame rate in the high frame rate operation.

It should be mentioned that all values mentioned herein, e.g., thresholds, frame rates, a number of steps, a step pitch and speeds, are only intended to illustrate but not to limit the present disclosure. Upshift and downshift thresholds different from Table II to Table IV are programmed in a mouse chip before shipment corresponding to different mouse products according to different requirements.

As mentioned above, in the conventional frame rate control method of a navigation device, the frame rate oscillation may occur while a very high frame rate (e.g., higher than 5000 frame per second) is used by the image sensor to capture image frames, generally in the gaming mouse. Accordingly, the present disclosure further provides a navigation device (e.g., FIG. 1) and a frame rate control method thereof (e.g., FIG. 2 and Table II to Table IV) that adjusts an upshift threshold and a downshift threshold when a current moving speed at a current frame rate is larger than an upshift speed threshold as well as a downshift speed threshold, corresponding to a higher step of frame rate, is higher than the upshift threshold at the current frame rate.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. A navigation device, comprising:
an image sensor, configured to capture image frames at one of multiple predetermined frame rates;
a memory, recording an upshift threshold and a downshift threshold; and
a processor, configured to
calculate a moving speed according to the image frames captured by the image sensor at a current frame rate,
compare the moving speed with an upshift speed, which corresponds to the upshift threshold at the current frame rate, and
adjust at least one of the upshift threshold and the downshift threshold upon the moving speed being larger than the upshift speed, and
a downshift speed, which corresponds to the downshift threshold at a frame rate one step higher than the current frame rate, being higher than the upshift speed.

2. The navigation device as claimed in claim 1, wherein a unit of the upshift threshold and the downshift threshold is a number of pixels of the image sensor.

3. The navigation device as claimed in claim 1, wherein a unit of the upshift speed and the downshift speed is an inch per second.

4. The navigation device as claimed in claim 1, wherein in the adjusting, the processor is configured to increase the upshift threshold and decrease the downshift threshold.

5. The navigation device as claimed in claim 1, wherein in the adjusting, the processor is configured to increase the upshift threshold but maintain the downshift threshold.

6. The navigation device as claimed in claim 1, wherein in the adjusting, the processor is configured to maintain the upshift threshold but decrease the downshift threshold.

7. The navigation device as claimed in claim 1, wherein the processor is further configured to switch the current frame rate to the frame rate one step higher than the current frame rate upon the moving speed being higher than the adjusted upshift speed when the upshift threshold is adjusted.

8. The navigation device as claimed in claim 1, wherein the processor is further configured to switch the current frame rate to the frame rate one step higher than the current frame rate upon the moving speed being higher than the upshift speed when the upshift threshold is not adjusted.

9. A navigation device, comprising:
an image sensor, configured to capture image frames at one of multiple predetermined frame rates; and
a memory, recording a first upshift threshold, a second upshift threshold lower than the first upshift threshold, a first downshift threshold lower than the first upshift threshold, and a second downshift threshold lower than the first downshift threshold as well as the second upshift threshold; and
a processor, configured to
calculate a moving speed according to the image frames captured by the image sensor at a current frame rate,
switch the current frame rate to a frame rate one step higher than the current frame rate upon the moving speed becoming higher than a first upshift speed, which corresponds to the first upshift threshold, or higher than a second upshift speed, which corresponds to the second upshift threshold, and
switch the current frame rate to a frame rate one step lower than the current frame rate upon the moving speed becoming lower than a first downshift speed, which corresponds to the first downshift threshold, or lower than a second downshift speed, which corresponds to the second downshift threshold.

10. The navigation device as claimed in claim 9, wherein a unit of the first and second upshift thresholds and the first and second downshift thresholds is a number of pixels of the image sensor.

11. The navigation device as claimed in claim 9, wherein a unit of the first and second upshift speeds and the first and second downshift speeds is an inch per second.

12. The navigation device as claimed in claim 9, wherein frame rates among the multiple predetermined frame rates corresponding to the first upshift threshold and the first downshift threshold are higher than 5000 frames per second.

13. The navigation device as claimed in claim 9, wherein the first upshift threshold and the first downshift threshold are arranged in the way that the first downshift speed at a current step of frame rate is lower than the first upshift speed at a step of frame rate previous to the current step of frame rate.

14. The navigation device as claimed in claim 9, wherein the first upshift threshold and the first downshift threshold are arranged corresponding to the highest frame rate among the multiple predetermined frame rates.

15. The navigation device as claimed in claim 9, wherein the memory further records a third upshift threshold between the first upshift threshold and the second upshift threshold, and a third downshift threshold between the first downshift threshold and the second downshift threshold.

16. The navigation device as claimed in claim 15, wherein the memory further records a fourth upshift threshold between the third upshift threshold and the second upshift threshold, and a fourth downshift threshold between the third downshift threshold and the second downshift threshold.

17. A frame rate control method of a navigation device, the navigation device comprising an image sensor, a memory recorded with an upshift threshold and a downshift threshold, and a processor, and the frame rate control method comprising:

capturing, using the image sensor, image frames at a current frame rate;

calculating, using the processor, a moving speed according to the image frames;

comparing, using the processor, the moving speed with an upshift speed, which corresponds to the upshift threshold at the current frame rate; and adjusting the upshift threshold and the downshift threshold upon the moving speed being larger than the upshift speed as well as a downshift speed, which corresponds to the downshift threshold at a frame rate one step higher than the current frame rate, being higher than the upshift threshold.

18. The frame rate control method as claimed in claim 17, the adjusting comprising:

increasing the upshift threshold and decreasing the downshift threshold to cause the downshift speed corresponding to the decreased downshift threshold to be lower than the upshift speed corresponding to the increased upshift threshold.

19. The frame rate control method as claimed in claim 17, the adjusting comprising:

increasing both the upshift threshold and the downshift threshold corresponding to the highest operable frame rates of the image sensor to cause the downshift speed corresponding to the increased downshift threshold to be lower than the upshift speed corresponding to the increased upshift threshold.

20. The frame rate control method as claimed in claim 17, wherein a unit of the upshift threshold and the downshift threshold is a number of pixels of the image sensor, and a unit of the upshift speed and the downshift speed is an inch per second.

\* \* \* \* \*